United States Patent
Fiala et al.

[11] 4,018,478
[45] Apr. 19, 1977

[54] SAFETY BELT

[75] Inventors: Ernst Fiala, Braunschweig-Querum; Andreas Bauer, Fallersleben, both of Germany

[73] Assignee: Volkswagenwerk Aktiengesellschaft, Wolfsburg, Germany

[22] Filed: May 15, 1972

[21] Appl. No.: 253,296

[30] Foreign Application Priority Data

May 29, 1971   Germany ............... 2126939

[52] U.S. Cl. ............................. 297/385
[51] Int. Cl.² ........................... A62B 35/00
[58] Field of Search ......... 297/385, 389, 390, 388; 280/150 SB

[56] References Cited

UNITED STATES PATENTS

| | | | |
|---|---|---|---|
| 1,498,916 | 6/1924 | Hunter | 428/376 |
| 1,805,576 | 5/1931 | Felix | 428/365 |
| 2,169,920 | 8/1939 | Claud-Mantle | 24/123.3 |
| 2,475,588 | 7/1949 | Bierman | 297/385 |
| 2,508,822 | 5/1950 | Goldberg | 297/390 X |
| 2,613,865 | 10/1952 | Rose | 297/385 |
| 2,880,789 | 4/1959 | Liebinger | 297/385 X |
| 3,306,662 | 2/1967 | Finnigan | 297/389 |
| 3,414,326 | 12/1968 | Raffaelli | 297/385 |
| 3,546,058 | 12/1970 | Loew | 428/365 |
| 3,578,763 | 5/1971 | Platou | 87/6 |
| 3,583,761 | 6/1971 | Hume | 297/389 |
| 3,608,962 | 9/1971 | Knecht | 297/385 |
| 3,717,216 | 2/1973 | Rothschild | 297/388 |

FOREIGN PATENTS OR APPLICATIONS

| | | | |
|---|---|---|---|
| 675,736 | 11/1964 | Italy | 297/385 |

*Primary Examiner*—James T. McCall
*Attorney, Agent, or Firm*—Brumbaugh, Graves, Donohue & Raymond

[57] ABSTRACT

A safety belt is disclosed which is suitable for use in vehicles to hold occupants in the vehicles in the event of a collision. It possesses elasticity and has a generally round cross-sectional shape in those portions of the belt which are adapted to come in contact with the occupant during a collision. The round cross-sectional shape and elasticity enable the belt to deform slightly when a person's body is thrown against it thereby reducing the danger of constriction damage to the person's body. The round cross-sectional shape also insures that the belt is less likely to be twisted into a shape which would jam automatic belt retractors and their associated guides.

4 Claims, 4 Drawing Figures

SAFETY BELT

BACKGROUND OF THE INVENTION

The present invention is a safety belt which can be used in vehicles, such as cars, airplanes and the like, to hold occupants of the vehicle securely in place in their seats in the vehicle in the event of sudden deceleration of the vehicle or collision of the vehicle with another object. Safety belts which perform this function are well-known but are formed having a very thin, tape-like shape. Such a belt is not deformable and is easily twisted into a more narrow and more rope-like structure. When a person's body is thrown against such a belt, a severe constriction is commonly caused which leads to injury. Conventional belts are also quite easily twisted into shapes which cause them to become jammed if they are being dispensed from automatic belt retractors and guides which are commonly associated with such retractors. The apparatus of the present invention is designed to overcome both of these aforementioned disadvantages of conventional safety belts.

SUMMARY OF THE INVENTION

The present invention is a safety belt which has a generally round cross section in at least those portions of the belt which are designed to come into contact with the occupant's body. Such a construction precludes the possibility that the belt will be twisted into a more narrow and more rope-like structure which poses a danger to the safety and comfort of the occupant. The round cross section also precludes twisting of the belt into shapes which can cause jamming in the automatic belt retractors and guides associated therewith. The belt is deformable to a substantially flattened cross section to reduce the danger of constriction damage to the body of the occupant.

BRIEF DESCRIPTION OF THE DRAWINGS

The apparatus of the present invention is further understood by reference to the following description of a preferred, exemplary embodiment of the invention, and the appended drawings wherein.

PREFERRED EMBODIMENTS OF THE INVENTION

Figure 1:
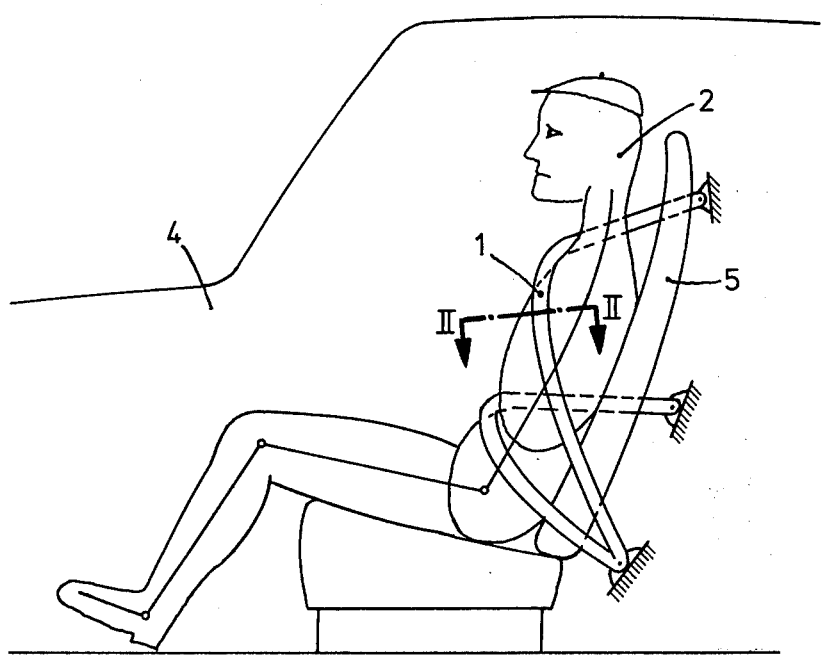
FIG. 1 is a schematic view showing the safety belt of the present invention in position around the occupant's body in a vehicle.

As seen in FIG. 1, the safety belt 1 of the present invention in one particular embodiment comprises two separate strands, one of which reaches around the shoulder and chest of an occupant 2 in a seat 5 of a vehicle 4 whereas the other strand reaches around his waist. This type of belt is well-known and is used quite commonly in automobile vehicles to keep the occupant, in the event of a collision, from being pitched forward out of the seat into the structure of the vehicle, or in an extreme case, through the windshield of the vehicle. As is well-known in the art, each of the belt strands may be fixedly attached at one end to a portion of the vehicle and at the other end to a suitable latching mechanism which can be disengaged by the occupant. The improved belt configuration according to the invention, is particularly suited for use with automatic retracting devices and guides. If desired, the belt structure of the invention can be used in a single lap belt or a single shoulder belt.

Figure 2:
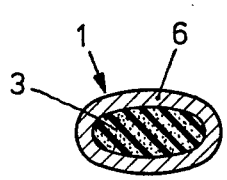
FIG. 2 is a cross-sectional view through lines II—II in FIG. 1 showing one embodiment of a safety belt of the present invention having an elliptical cross section.
Figure 2B:
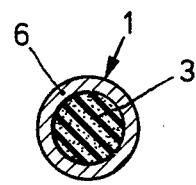
FIG. 2b is a cross-sectional view similar to the one in FIG. 2 showing another embodiment of the safety belt of the present invention in which the belt has a circular cross section.
Figure 3:
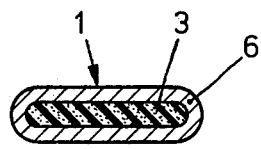
FIG. 3 is a view in cross section similar to the views in FIGS. 2 and 2b showing the safety belt of the present invention when it is under stress due to the pressure of the occupant's body upon it when the vehicle collides with another object.

As best seen in FIGS. 2 and 2b, the safety belt is of rounded cross-section, that is circular or elliptical in cross section. In the illustrated embodiment an outer skin 6 encases a core 3. The skin 6 can be a flexible strong material, for example, the synthetic materials presently used in safety belts, or a strong fabric such as canvas is suitable. In that case the core 3 is selected to permit elastic compression of the belt's cross section, preferably to the degree shown in FIG. 3. One example of a preferred filling material is foam rubber; others may be chosen from a long list of compressible materials known in the art.

On the other hand, a suitably resilient and flexible skin 6, such as rubber, for example, may be chosen and used with an air core 3. An important consideration of such an embodiment is the ability of the belt to compress when an occupant is thrown against it and to return to shape thereafter.

The round cross section of the belt precludes the belt's being twisted into a more narrow and more rope-like structure which commonly increases the likelihood of harm to an occupant, causes annoyance and discomfort, and fouls the automatic belt retracting equipment. If a collision occurs, when the occupant is thrown forwardly against the belt of the present invention, the belt's round cross-sectional area will contact his body and deform to the shape shown in cross section in FIG. 3. In this shape the belt has a greater area in contact with the occupant's body, thus reducing the pressure which is exerted against that portion of the body. With conventional belts the greater probability of their being twisted into more narrow and more ropelike structures raises the likelihood of a smaller area being present and consequently a greater degree of harm, discomfort and annoyance being produced. The probability of injury to the occupant and the danger that the belt will be fouled if it is used with automatic belt retractors is substantially reduced using the safety belt of the present invention.

A person reading the foregoing specification and examining the claims appended hereto will become aware of modifications that can be made to the present invention. Hence, it is intended that the foregoing is merely illustrative of the invention and is not to be taken as limiting in any sense. The invention is defined in the appended claims.

We claim:

1. A safety belt attached to a vehicle so as to hold passengers secure in the vehicle in the event of a collision, the belt having flexible passenger restraining strands of a generally round crosssectional shape and being elastically compressible to a generally flattened elliptical shape, said strands comprising an outer high tensile strength flexible skin defining a hollow interior, and an interior core of deformable elastic material enclosed by the outer skin and filling the interior, said interior core of deformable material forming the strands into the rounded crosssection absent the application of deforming forces thereto and spreading and flattening the strands to form an increased surface area in contact with the passenger upon the application thereto of forces normally caused by the restraint of the secured passenger by the outer skin.

2. A safety belt as claimed in claim 1 wherein the outer skin is a fabric.

3. A belt as claimed in claim 2 wherein the fabric is canvas.

4. A safety belt as claimed in claim 1 wherein the elastic material is foam rubber.

* * * * *